United States Patent
Kelly

(10) Patent No.: US 10,281,659 B2
(45) Date of Patent: May 7, 2019

(54) FIBER-MANAGEMENT SOLUTION FOR AN OPTICAL-NETWORK NODE

(71) Applicant: Alcatel-Lucent Canada Inc., Ottawa (CA)

(72) Inventor: Colin G. Kelly, Ottawa (CA)

(73) Assignee: ALCATEL LUCENT, Nozay (FR)

( * ) Notice: Subject to any disclaimer, the term of this patent is extended or adjusted under 35 U.S.C. 154(b) by 0 days.

(21) Appl. No.: 15/711,480

(22) Filed: Sep. 21, 2017

(65) Prior Publication Data

US 2018/0120520 A1   May 3, 2018

Related U.S. Application Data

(60) Provisional application No. 62/416,794, filed on Nov. 3, 2016.

(51) Int. Cl.
*H04J 14/02* (2006.01)
*G02B 6/38* (2006.01)
(Continued)

(52) U.S. Cl.
CPC ......... *G02B 6/3885* (2013.01); *H04B 10/801* (2013.01); *H04J 14/021* (2013.01);
(Continued)

(58) Field of Classification Search
CPC .... H04B 10/271; H04B 10/801–10/803; H04J 14/0217–14/022; H04J 2203/0001–2203/0075
See application file for complete search history.

(56) References Cited

U.S. PATENT DOCUMENTS 5,155,785 A * 10/1992 Holland ............... G02B 6/3608
156/158
6,585,524 B2 * 7/2003 Robinson ................. G02B 6/04
385/137
(Continued)

FOREIGN PATENT DOCUMENTS

EP   1124147 A2   8/2001
EP   1124147 A3   2/2002

OTHER PUBLICATIONS

"12 Fiber MPO MultiMode Trunk Cables," Commscope, 2015, retrieved from http://www.commscope.com, pp. 1-4.
(Continued)

*Primary Examiner* — Li Liu
(74) *Attorney, Agent, or Firm* — Mendelsohn Dunleavy, P.C.; Yuri Gruzdkov

(57) ABSTRACT

We disclose a modular fiber-interconnect device that can be used in a ROADM to optically interconnect wavelength-selective switches and optical add/drop blocks thereof. An example module of the modular fiber-interconnect device has seventeen optical ports, each implemented using an MPO connector of the same type. The number of (nominally identical) modules in the modular fiber-interconnect device depends on the degree N of the ROADM and can vary, e.g., from two for N=4 to fourteen or more for N≥20. A proper set of duplex optical connections within the ROADM can be created in a relatively straightforward manner, e.g., by running MPO cables of the same type from the wavelength-selective switches and the optical add/drop blocks of the ROADM to appropriate optical ports of the various modules of the modular fiber-interconnect device.

19 Claims, 14 Drawing Sheets

(51) Int. Cl.
H04B 10/80 (2013.01)
G02B 6/35 (2006.01)

(52) U.S. Cl.
CPC ........ *H04J 14/022* (2013.01); *H04J 14/0212* (2013.01); *H04J 14/0217* (2013.01); *G02B 6/356* (2013.01); *H04J 2203/0012* (2013.01)

(56) References Cited

U.S. PATENT DOCUMENTS

| | | | | |
|---|---|---|---|---|
| 6,885,800 B2* | 4/2005 | Sun | ............ | G02B 6/28 |
| | | | | 385/114 |
| 7,689,079 B2* | 3/2010 | Burnham | ............ | G02B 6/3897 |
| | | | | 385/15 |
| 9,282,037 B2* | 3/2016 | Parker | ............ | G06F 15/17362 |
| 2010/0150558 A1* | 6/2010 | Wisseman | ............ | H04J 14/0212 |
| | | | | 398/79 |
| 2010/0202778 A1* | 8/2010 | Wisseman | ............ | G02B 6/2931 |
| | | | | 398/83 |
| 2011/0076016 A1* | 3/2011 | Wisseman | ............ | H04J 14/0204 |
| | | | | 14/204 |
| 2013/0195451 A1* | 8/2013 | Ghioni | ............ | H04J 14/0212 |
| | | | | 398/50 |
| 2015/0244492 A1* | 8/2015 | Lee | ............ | H04J 14/0212 |
| | | | | 398/48 |

OTHER PUBLICATIONS

"Clarification of Terminology—MPO and MTP," White Paper, Commscope, 2011, retrieved from http://www.commscope.com/Docs/Clarification_of_Terminology_MPO_and_MTP_WP_pdf., pp. 1-3.

"CDC ROADM Applications and Cost Comparison," Fujitsu, 2014, retrieved from http://www.fujitsu.com/us/Images/CDC-ROADM-Cost-Comparison.pdf, pp. 1-6.

"MPO Connector Family—Multifiber Push-On: A Complete High-Density Fiber Optic Connectivity Solutions," OFS, 2016, retrieved from http://fiber-optic-catalog.ofsoptics.com/Asset/MPO-Adapter-Family-219-web.pdf, pp. 1-4.

"ROADM Evolves: Should You Be Paying Attention?" Infonetics, Feb. 2006, retrieved from www.infonetics.com/ . . . /infonetics-roadm-evolves-white-paper-february-2006.pdf, pp. 1-14.

Perrin, Sterling. "The need for next-generation ROADM networks." Heavy Reading, Sep. (2010), pp. 1-15.

Watanabe, T., K. Suzuki, and T. Takahashi. "Multicast switch technology that enhances ROADM operability." NTT Tech. Rev 12.1 (2014): 1-5.

"Guide to Fiber Optics & Premises Cabling," The Fiber Optics Association, 2016, http://www.thefoa.org/tech/ref/testing/test-MPO.html, pp. 1-15.

"Multifiber Push-On (MPO) Connectors deliver High Performance Across the Network," TE Connectivity, 2011, retrieved from https://eng.eewiki.net/app/db_page/get_file.php?docid=28588, pp. 1-4.

"Cisco NCS 2000 Flex Spectrum Single Module RAODM Line Cards Data Sheet;" Mar. 2017, as retrieved from: https://www.cisco.com/c/en/us/products/collateral/optical-networking/network-convergence-system-2000-series/datasheet-c78-734544.html.

"Cisco Network Convergence System 2000 Series Passive Auxiliary Modules," Jul. 2017, as retrieved from: https://www.cisco.com/c/en/us/products/collateral/optical-networking/network-convergence-system-2000-series/datasheet-c78-735034.html.

"FlexPlane Optical Flex Circuits," 2012, as retrieved from: http://www.molex.com/molex/products/family?key=flexplanetrade&channel=products&chanName=family&pageTitle=Introduction.

"Optical Interconnections Using Polymer Waveguides," 2008, as retrieved from: http://opticalinterlinks.com/images/Fisher_Booth_Paper_OIL_Poly_WG_Conn.pdf.

"Optical InterLinks," as retrieved on, Nov. 16, 2017, from: http://www.opticalinterlinks.com/fiber_and_shuffles.html.

* cited by examiner

100

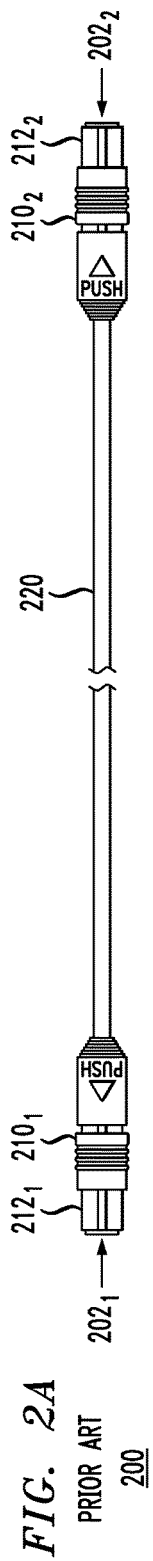
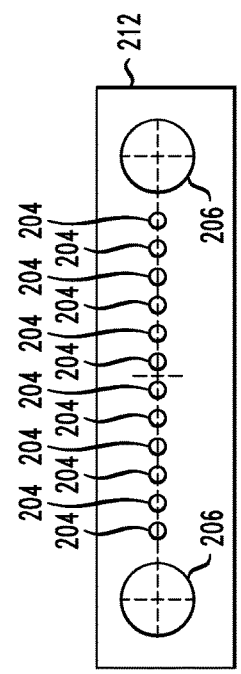
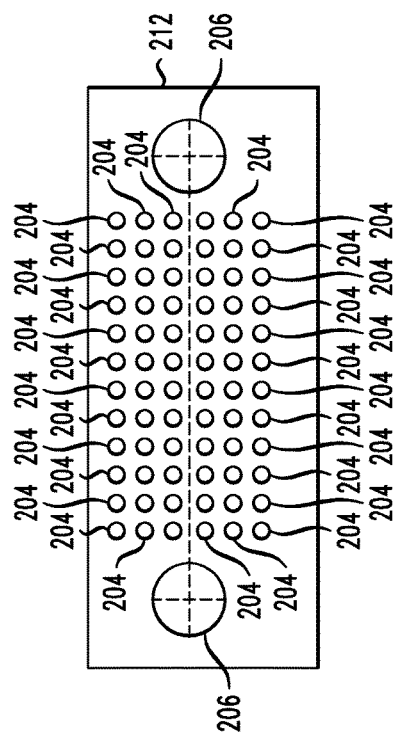
FIG. 2A
PRIOR ART
200
FIG. 2B
PRIOR ART
202
FIG. 2C
PRIOR ART
202

300

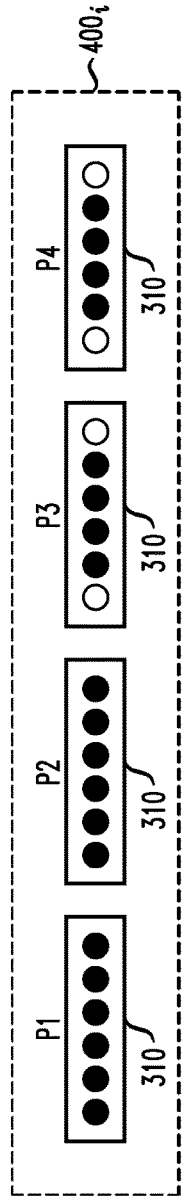
FIG. 4
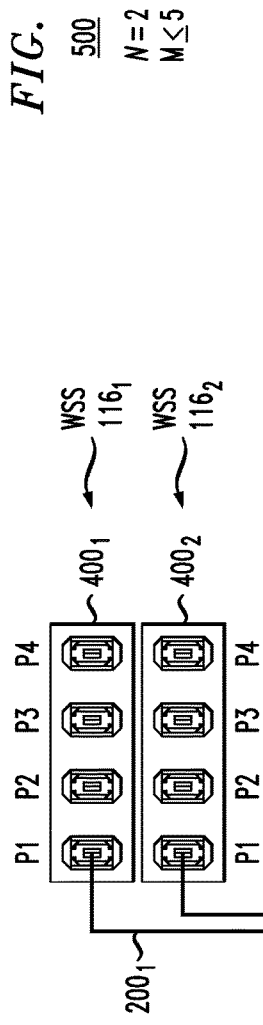
FIG. 5
500
N=2
M≤5
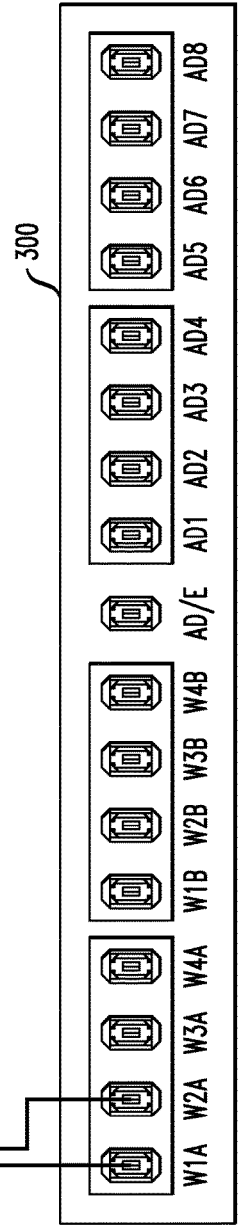

FIG. 8

TABLE 1: PORT CONNECTIONS OF MODULES 300
OF FIBER-INTERCONNECT DEVICE 130 IN DEGREE-8 ROADM 100

| MODULE-> <br> PORT: | $300_1$ | $300_2$ | $300_3$ | $300_4$ |
|---|---|---|---|---|
| W1A | $P1(400_1)$ | $P3(400_1)$ | $P1(400_5)$ | $P3(400_5)$ |
| W2A | $P1(400_2)$ | $P3(400_2)$ | $P1(400_6)$ | $P3(400_6)$ |
| W3A | $P1(400_3)$ | $P3(400_3)$ | $P1(400_7)$ | $P3(400_7)$ |
| W4A | $P1(400_4)$ | $P3(400_4)$ | $P1(400_8)$ | $P3(400_8)$ |
| W1B | $P2(400_1)$ | $P4(400_1)$ | $P2(400_5)$ | -- |
| W2B | $P2(400_2)$ | $P4(400_2)$ | $P2(400_6)$ | -- |
| W3B | $P2(400_3)$ | $P4(400_3)$ | $P2(400_7)$ | -- |
| W4B | $P2(400_4)$ | $P4(400_4)$ | $P2(400_8)$ | -- |
| AD/E | $150_1$ | -- | $150_1$ | -- |
| AD1 | $150_2$ | $150_{10}$ | $150_2$ | $150_{10}$ |
| AD2 | $150_3$ | $150_{11}$ | $150_3$ | $150_{11}$ |
| AD3 | $150_4$ | $150_{12}$ | $150_4$ | $150_{12}$ |
| AD4 | $150_5$ | $150_{13}$ | $150_5$ | $150_{13}$ |
| AD5 | $150_6$ | $P4(400_5)$ | $150_6$ | -- |
| AD6 | $150_7$ | $P4(400_6)$ | $150_7$ | -- |
| AD7 | $150_8$ | $P4(400_7)$ | $150_8$ | -- |
| AD8 | $150_9$ | $P4(400_8)$ | $150_9$ | -- |

FIG. 9

TABLE 2: PORT CONNECTIONS OF MODULES 300
OF FIBER-INTERCONNECT DEVICE 130 IN DEGREE-12 ROADM 100

| MODULE-><br>PORT: | $300_1$ | $300_2$ | $300_3$ | $300_4$ | $300_5$ |
|---|---|---|---|---|---|
| W1A | P1($400_1$) | P3($400_1$) | P1($400_5$) | P3($400_5$) | *P1($400_9$)* |
| W2A | P1($400_2$) | P3($400_2$) | P1($400_6$) | P3($400_6$) | *P1($400_{10}$)* |
| W3A | P1($400_3$) | P3($400_3$) | P1($400_7$) | P3($400_7$) | *P1($400_{11}$)* |
| W4A | P1($400_4$) | P3($400_4$) | P1($400_8$) | P3($400_8$) | *P1($400_{12}$)* |
| W1B | P2($400_1$) | P4($400_1$) | P2($400_5$) | -- | *P2($400_9$)* |
| W2B | P2($400_2$) | P4($400_2$) | P2($400_6$) | -- | *P2($400_{10}$)* |
| W3B | P2($400_3$) | P4($400_3$) | P2($400_7$) | -- | *P2($400_{11}$)* |
| W4B | P2($400_4$) | P4($400_4$) | P2($400_8$) | -- | *P2($400_{12}$)* |
| AD/E | $150_1$ | -- | $150_1$ | -- | *$150_1$* |
| AD1 | $150_2$ | *P3($400_9$)* | $150_2$ | *P4($400_9$)* | *$150_2$* |
| AD2 | $150_3$ | *P3($400_{10}$)* | $150_3$ | *P4($400_{10}$)* | *$150_3$* |
| AD3 | $150_4$ | *P3($400_{11}$)* | $150_4$ | *P4($400_{11}$)* | *$150_4$* |
| AD4 | $150_5$ | *P3($400_{12}$)* | $150_5$ | *P4($400_{12}$)* | *$150_5$* |
| AD5 | $150_6$ | P4($400_5$) | $150_6$ | -- | *$150_6$* |
| AD6 | $150_7$ | P4($400_6$) | $150_7$ | -- | *$150_7$* |
| AD7 | $150_8$ | P4($400_7$) | $150_8$ | -- | *$150_8$* |
| AD8 | $150_9$ | P4($400_8$) | $150_9$ | -- | *$150_9$* |

FIG. 10

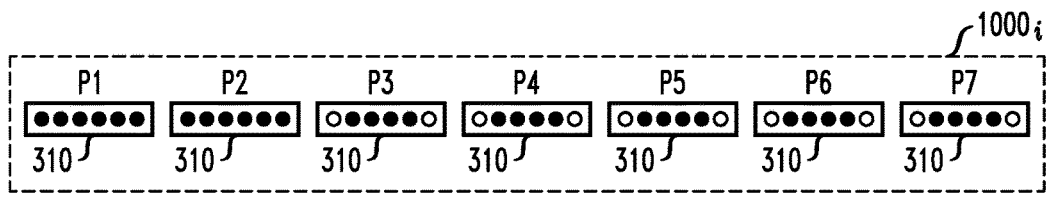

TABLE 3: PORT CONNECTIONS OF MODULES 300 OF FIBER-INTERCONNECT DEVICE 130 IN DEGREE-12 ROADM 100

| MODULE→<br>PORT: | $300_1$ | $300_2$ | $300_3$ | $300_4$ | $300_5$ | $300_6$ | $300_7$ | $300_8$ |
|---|---|---|---|---|---|---|---|---|
| W1A | P1($1000_1$) | P3($1000_1$) | P5($1000_1$) | P1($1000_5$) | P3($1000_5$) | P5($1000_5$) | P1($1000_9$) | P3($1000_9$) |
| W2A | P1($1000_2$) | P3($1000_2$) | P5($1000_2$) | P1($1000_6$) | P3($1000_6$) | P5($1000_6$) | P1($1000_{10}$) | P3($1000_{10}$) |
| W3A | P1($1000_3$) | P3($1000_3$) | P5($1000_3$) | P1($1000_7$) | P3($1000_7$) | P5($1000_7$) | P1($1000_{11}$) | P3($1000_{11}$) |
| W4A | P1($1000_4$) | P3($1000_4$) | P5($1000_4$) | P1($1000_8$) | P3($1000_8$) | P5($1000_8$) | P1($1000_{12}$) | P3($1000_{12}$) |
| W1B | P2($1000_1$) | P4($1000_1$) | P6($1000_1$) | P2($1000_5$) | P4($1000_5$) | -- | P2($1000_9$) | P4($1000_9$) |
| W2B | P2($1000_2$) | P4($1000_2$) | P6($1000_2$) | P2($1000_6$) | P4($1000_6$) | -- | P2($1000_{10}$) | P4($1000_{10}$) |
| W3B | P2($1000_3$) | P4($1000_3$) | P6($1000_3$) | P2($1000_7$) | P4($1000_7$) | -- | P2($1000_{11}$) | P4($1000_{11}$) |
| W4B | P2($1000_4$) | P4($1000_4$) | P6($1000_4$) | P2($1000_8$) | P4($1000_8$) | -- | P2($1000_{12}$) | P4($1000_{12}$) |
| AD/E | $150_1$ | -- | -- | $150_1$ | -- | P6($1000_9$) | $150_1$ | -- |
| AD1 | $150_2$ | $150_{10}$ | P5($1000_9$) | $150_2$ | $150_{10}$ | P6($1000_{10}$) | $150_2$ | $150_{10}$ |
| AD2 | $150_3$ | $150_{11}$ | P5($1000_{10}$) | $150_3$ | $150_{11}$ | P6($1000_{11}$) | $150_3$ | $150_{11}$ |
| AD3 | $150_4$ | $150_{12}$ | P5($1000_{11}$) | $150_4$ | $150_{12}$ | P6($1000_{12}$) | $150_4$ | $150_{12}$ |
| AD4 | $150_5$ | $150_{13}$ | P5($1000_{12}$) | $150_5$ | $150_{13}$ | -- | $150_5$ | $150_{13}$ |
| AD5 | $150_6$ | $150_{14}$ | P6($1000_5$) | $150_6$ | $150_{14}$ | -- | $150_6$ | $150_{14}$ |
| AD6 | $150_7$ | $150_{15}$ | P6($1000_6$) | $150_7$ | $150_{15}$ | -- | $150_7$ | $150_{15}$ |
| AD7 | $150_8$ | $150_{16}$ | P6($1000_7$) | $150_8$ | $150_{16}$ | -- | $150_8$ | $150_{16}$ |
| AD8 | $150_9$ | $150_{17}$ | P6($1000_8$) | $150_9$ | $150_{17}$ | -- | $150_9$ | $150_{17}$ |

TABLE 4: PORT CONNECTIONS OF MODULES 300 OF FIBER-INTERCONNECT DEVICE 130 IN DEGREE-16 ROADM 100

| MODULE→<br>PORT: | $300_1$ | $300_2$ | $300_3$ | $300_4$ | $300_5$ | $300_6$ | $300_7$ | $300_8$ |
|---|---|---|---|---|---|---|---|---|
| | ⋮ | ⋮ | ⋮ | ⋮ | ⋮ | ⋮ | ⋮ | ⋮ |
| W1A | P1(1000$_1$) | P3(1000$_1$) | P5(1000$_1$) | P1(1000$_5$) | P3(1000$_5$) | P5(1000$_5$) | P1(1000$_9$) | P3(1000$_9$) |
| W2A | P1(1000$_2$) | P3(1000$_2$) | P5(1000$_2$) | P1(1000$_6$) | P3(1000$_6$) | P5(1000$_6$) | P1(1000$_{10}$) | P3(1000$_{10}$) |
| W3A | P1(1000$_3$) | P3(1000$_3$) | P5(1000$_3$) | P1(1000$_7$) | P3(1000$_7$) | P5(1000$_7$) | P1(1000$_{11}$) | P3(1000$_{11}$) |
| W4A | P1(1000$_4$) | P3(1000$_4$) | P5(1000$_4$) | P1(1000$_8$) | P3(1000$_8$) | P5(1000$_8$) | P1(1000$_{12}$) | P3(1000$_{12}$) |
| W1B | P2(1000$_1$) | P4(1000$_1$) | P6(1000$_1$) | P2(1000$_5$) | P4(1000$_5$) | *P7(1000$_5$)* | P2(1000$_9$) | P4(1000$_9$) |
| W2B | P2(1000$_2$) | P4(1000$_2$) | P6(1000$_2$) | P2(1000$_6$) | P4(1000$_6$) | *P7(1000$_6$)* | P2(1000$_{10}$) | P4(1000$_{10}$) |
| W3B | P2(1000$_3$) | P4(1000$_3$) | P6(1000$_3$) | P2(1000$_7$) | P4(1000$_7$) | *P7(1000$_7$)* | P2(1000$_{11}$) | P4(1000$_{11}$) |
| W4B | P2(1000$_4$) | P4(1000$_4$) | P6(1000$_4$) | P2(1000$_8$) | P4(1000$_8$) | *P7(1000$_8$)* | P2(1000$_{12}$) | P4(1000$_{12}$) |
| AD/E | 150$_1$ | -- | -- | 150$_1$ | -- | -- | 150$_1$ | -- |
| AD1 | 150$_2$ | 150$_{10}$ | P5(1000$_9$) | 150$_2$ | 150$_{10}$ | P6(1000$_9$) | 150$_2$ | 150$_{10}$ |
| AD2 | 150$_3$ | 150$_{11}$ | P5(1000$_{10}$) | 150$_3$ | 150$_{11}$ | P6(1000$_{10}$) | 150$_3$ | 150$_{11}$ |
| AD3 | 150$_4$ | 150$_{12}$ | P5(1000$_{11}$) | 150$_4$ | 150$_{12}$ | P6(1000$_{11}$) | 150$_4$ | 150$_{12}$ |
| AD4 | 150$_5$ | 150$_{13}$ | P5(1000$_{12}$) | 150$_5$ | 150$_{13}$ | P6(1000$_{12}$) | 150$_5$ | 150$_{13}$ |
| AD5 | 150$_6$ | 150$_{14}$ | P6(1000$_5$) | 150$_6$ | 150$_{14}$ | *P6(1000$_{13}$)* | 150$_6$ | 150$_{14}$ |
| AD6 | 150$_7$ | 150$_{15}$ | P6(1000$_6$) | 150$_7$ | 150$_{15}$ | *P6(1000$_{14}$)* | 150$_7$ | 150$_{15}$ |
| AD7 | 150$_8$ | 150$_{16}$ | P6(1000$_7$) | 150$_8$ | 150$_{16}$ | *P6(1000$_{15}$)* | 150$_8$ | 150$_{16}$ |
| AD8 | 150$_9$ | 150$_{17}$ | P6(1000$_8$) | 150$_9$ | 150$_{17}$ | *P6(1000$_{16}$)* | 150$_9$ | 150$_{17}$ |

FIG. 12 cont.

| $300_9$ | $300_{10}$ | $300_{11}$ | $300_{12}$ |
|---|---|---|---|
| $P7(1000_1)$ | $P7(1000_9)$ | $P1(1000_{13})$ | $P3(1000_{13})$ |
| $P7(1000_2)$ | $P7(1000_{10})$ | $P1(1000_{14})$ | $P3(1000_{14})$ |
| $P7(1000_3)$ | $P7(1000_{11})$ | $P1(1000_{15})$ | $P3(1000_{15})$ |
| $P7(1000_4)$ | $P7(1000_{12})$ | $P1(1000_{16})$ | $P3(1000_{16})$ |
| --- | --- | $P2(1000_{13})$ | $P4(1000_{13})$ |
| --- | --- | $P2(1000_{14})$ | $P4(1000_{14})$ |
| --- | --- | $P2(1000_{15})$ | $P4(1000_{15})$ |
| $P5(1000_{13})$ | $P7(1000_{13})$ | $P2(1000_{16})$ | $P4(1000_{16})$ |
| $P5(1000_{14})$ | $P7(1000_{14})$ | $150_1$ | --- |
| $P5(1000_{15})$ | $P7(1000_{15})$ | $150_2$ | $150_{10}$ |
| $P5(1000_{16})$ | $P7(1000_{16})$ | $150_3$ | $150_{11}$ |
| --- | --- | $150_4$ | $150_{12}$ |
| --- | --- | $150_5$ | $150_{13}$ |
| --- | --- | $150_6$ | $150_{14}$ |
| --- | --- | $150_7$ | $150_{15}$ |
| --- | --- | $150_8$ | $150_{16}$ |
| --- | --- | $150_9$ | $150_{17}$ |

TABLE 5: PORT CONNECTIONS OF MODULES 300 OF FIBER-INTERCONNECT DEVICE 130 IN DEGREE-20 ROADM 100

| MODULE→<br>PORT: | $300_1$ | $300_2$ | $300_3$ | $300_4$ | $300_5$ | $300_6$ | $300_7$ | $300_8$ |
|---|---|---|---|---|---|---|---|---|
| W1A | $P1(1000_1)$ | $P3(1000_1)$ | $P5(1000_1)$ | $P1(1000_5)$ | $P3(1000_5)$ | $P5(1000_5)$ | $P1(1000_9)$ | $P3(1000_9)$ |
| W2A | $P1(1000_2)$ | $P3(1000_2)$ | $P5(1000_2)$ | $P1(1000_6)$ | $P3(1000_6)$ | $P5(1000_6)$ | $P1(1000_{10})$ | $P3(1000_{10})$ |
| W3A | $P1(1000_3)$ | $P3(1000_3)$ | $P5(1000_3)$ | $P1(1000_7)$ | $P3(1000_7)$ | $P5(1000_7)$ | $P1(1000_{11})$ | $P3(1000_{11})$ |
| W4A | $P1(1000_4)$ | $P3(1000_4)$ | $P5(1000_4)$ | $P1(1000_8)$ | $P3(1000_8)$ | $P5(1000_8)$ | $P1(1000_{12})$ | $P3(1000_{12})$ |
| W1B | $P2(1000_1)$ | $P4(1000_1)$ | $P6(1000_1)$ | $P2(1000_5)$ | $P4(1000_5)$ | $P7(1000_5)$ | $P2(1000_9)$ | $P4(1000_9)$ |
| W2B | $P2(1000_2)$ | $P4(1000_2)$ | $P6(1000_2)$ | $P2(1000_6)$ | $P4(1000_6)$ | $P7(1000_6)$ | $P2(1000_{10})$ | $P4(1000_{10})$ |
| W3B | $P2(1000_3)$ | $P4(1000_3)$ | $P6(1000_3)$ | $P2(1000_7)$ | $P4(1000_7)$ | $P7(1000_7)$ | $P2(1000_{11})$ | $P4(1000_{11})$ |
| W4B | $P2(1000_4)$ | $P4(1000_4)$ | $P6(1000_4)$ | $P2(1000_8)$ | $P4(1000_8)$ | $P7(1000_8)$ | $P2(1000_{12})$ | $P4(1000_{12})$ |
| AD/E | $150_1$ | — | — | $150_1$ | — | — | $150_1$ | — |
| AD1 | $150_2$ | $150_{10}$ | $P5(1000_9)$ | $150_2$ | $150_{10}$ | $P6(1000_9)$ | $150_2$ | $150_{10}$ |
| AD2 | $150_3$ | $150_{11}$ | $P5(1000_{10})$ | $150_3$ | $150_{11}$ | $P6(1000_{10})$ | $150_3$ | $150_{11}$ |
| AD3 | $150_4$ | $150_{12}$ | $P5(1000_{11})$ | $150_4$ | $150_{12}$ | $P6(1000_{11})$ | $150_4$ | $150_{12}$ |
| AD4 | $150_5$ | $150_{13}$ | $P5(1000_{12})$ | $150_5$ | $150_{13}$ | $P6(1000_{12})$ | $150_5$ | $150_{13}$ |
| AD5 | $150_6$ | $P4(1000_{17})$ | $P6(1000_5)$ | $150_6$ | $P5(1000_{17})$ | $P6(1000_{13})$ | $150_6$ | $P6(1000_{17})$ |
| AD6 | $150_7$ | $P4(1000_{18})$ | $P6(1000_6)$ | $150_7$ | $P5(1000_{18})$ | $P6(1000_{14})$ | $150_7$ | $P6(1000_{18})$ |
| AD7 | $150_8$ | $P4(1000_{19})$ | $P6(1000_7)$ | $150_8$ | $P5(1000_{19})$ | $P6(1000_{15})$ | $150_8$ | $P6(1000_{19})$ |
| AD8 | $150_9$ | $P4(1000_{20})$ | $P6(1000_8)$ | $150_9$ | $P5(1000_{20})$ | $P6(1000_{16})$ | $150_9$ | $P6(1000_{20})$ |

| $300_9$ | $300_{10}$ | $300_{11}$ | $300_{12}$ | $300_{13}$ | $300_{14}$ |
|---|---|---|---|---|---|
| $P7(1000_1)$ | $P7(1000_9)$ | $P1(1000_{13})$ | $P3(1000_{13})$ | $P1(1000_{17})$ | $P3(1000_{17})$ |
| $P7(1000_2)$ | $P7(1000_{10})$ | $P1(1000_{14})$ | $P3(1000_{14})$ | $P1(1000_{18})$ | $P3(1000_{18})$ |
| $P7(1000_3)$ | $P7(1000_{11})$ | $P1(1000_{15})$ | $P3(1000_{15})$ | $P1(1000_{19})$ | $P3(1000_{19})$ |
| $P7(1000_4)$ | $P7(1000_{12})$ | $P1(1000_{16})$ | $P3(1000_{16})$ | $P1(1000_{20})$ | $P3(1000_{20})$ |
| --- | --- | $P2(1000_{13})$ | $P4(1000_{13})$ | $P2(1000_{17})$ | --- |
| --- | --- | $P2(1000_{14})$ | $P4(1000_{14})$ | $P2(1000_{18})$ | --- |
| --- | --- | $P2(1000_{15})$ | $P4(1000_{15})$ | $P2(1000_{19})$ | --- |
| --- | --- | $P2(1000_{16})$ | $P4(1000_{16})$ | $P2(1000_{20})$ | --- |
| $P5(1000_{13})$ | $P7(1000_{13})$ | $150_1$ | --- | $150_1$ | --- |
| $P5(1000_{14})$ | $P7(1000_{14})$ | $150_2$ | $150_{10}$ | $150_2$ | $150_{10}$ |
| $P5(1000_{15})$ | $P7(1000_{15})$ | $150_3$ | $150_{11}$ | $150_3$ | $150_{11}$ |
| $P5(1000_{16})$ | $P7(1000_{16})$ | $150_4$ | $150_{12}$ | $150_4$ | $150_{12}$ |
| --- | --- | $150_5$ | $150_{13}$ | $150_5$ | $150_{13}$ |
| --- | --- | $150_6$ | $P7(1000_{17})$ | $150_6$ | --- |
| --- | --- | $150_7$ | $P7(1000_{18})$ | $150_7$ | --- |
| --- | --- | $150_8$ | $P7(1000_{19})$ | $150_8$ | --- |
| --- | --- | $150_9$ | $P7(1000_{20})$ | $150_9$ | --- |

FIBER-MANAGEMENT SOLUTION FOR AN OPTICAL-NETWORK NODE

CROSS-REFERENCE TO RELATED APPLICATIONS

This application claims priority from U.S. Provisional Patent Application Ser. No. 62/416,794 filed on Nov. 3, 2016, and entitled "FIBER-MANAGEMENT SOLUTION FOR AN OPTICAL-NETWORK NODE," which is incorporated herein by reference in its entirety.

BACKGROUND

Field

The present disclosure relates to optical communication equipment and, more specifically but not exclusively, to equipment that can be used in an optical-network node.

Description of the Related Art

This section introduces aspects that may help facilitate a better understanding of the disclosure. Accordingly, the statements of this section are to be read in this light and are not to be understood as admissions about what is in the prior art or what is not in the prior art.

A reconfigurable optical add/drop multiplexer (ROADM) can be used to perform remote (re)configuration of a network node. A ROADM can be software-provisionable, which enables the network operator to remotely specify which of the carrier wavelengths are to be added, dropped, and/or passed through at the network node. This type of ROADMs can be used in regional, metro, and long-haul optical networks.

A network node or ROADM is often described in reference to its number of "degrees." Each degree represents a respective switching direction that is typically associated with a duplex fiber pair. For example, a degree-2 ROADM operates to switch optical signals in two directions, typically referred to as "East" and "West." A degree-4 ROADM operates to switch optical signals in four directions, typically referred to as "North," "South," "East," and "West," and so on.

The number of fiber interconnections within a ROADM can grow very rapidly as the ROADM's degree increases. For example, in some ROADMs, the number of fiber interconnections can exceed 1000. Due to the numerous fiber interconnections, effective and practical fiber-management solutions need to be developed for such ROADMs.

SUMMARY OF SOME SPECIFIC EMBODIMENTS

Disclosed herein are various embodiments of a modular fiber-interconnect device that can be used in a ROADM to optically interconnect wavelength-selective switches and optical add/drop blocks thereof. An example module of the modular fiber-interconnect device has seventeen optical ports, each implemented using a Multi-fiber Push On (MPO) connector of the same type. The number of (nominally identical) modules in the modular fiber-interconnect device depends on the degree N of the ROADM and can vary, e.g., from two for N=4 to fourteen or more for N≥20. Advantageously, a proper set of duplex optical connections within the ROADM can be created in a relatively straightforward manner, e.g., by running MPO cables of the same type from the wavelength-selective switches and the optical add/drop blocks of the ROADM to appropriate optical ports of the various modules of the modular fiber-interconnect device.

According to an example embodiment, provided is an apparatus comprising: a first set of optical ports; a second set of optical ports; a third set of optical ports; a fourth set of optical ports; and a plurality of optical waveguides, each disposed to optically connect a respective pair of the optical ports, the plurality of optical waveguides disposed to optically connect: each optical port of the first set to each optical port of the second set; each optical port of the first set to another optical port of the first set; each optical port of the third set to each optical port of the fourth set; and each optical port of the third set to two other optical ports of the third set.

BRIEF DESCRIPTION OF THE DRAWINGS

Other aspects, features, and benefits of various disclosed embodiments will become more fully apparent, by way of example, from the following detailed description and the accompanying drawings, in which:

FIGS. 2A-2C illustrate a fiber-optic cable that can be used in the ROADM of FIG. 1 according to some embodiments;

FIG. 4 shows a set of input/output ports of a WSS that can be used in the ROADM of FIG. 1 according to an embodiment;

FIG. 5 illustrates an arrangement of parts that can be used to implement a degree-2 ROADM according to an embodiment;

FIG. 8 lists port connections of a fiber-interconnect device that can be used in the ROADM of FIG. 1 according to an embodiment;

FIG. 9 lists port connections of a fiber-interconnect device that can be used in the ROADM of FIG. 1 according to another embodiment;

FIG. 10 shows a set of input/output ports of a WSS that can be used in the ROADM of FIG. 1 according to an alternative embodiment;

FIG. 11 lists port connections of a fiber-interconnect device that can be used in the ROADM of FIG. 1 according to yet another embodiment;

FIG. 12 lists port connections of a fiber-interconnect device that can be used in the ROADM of FIG. 1 according to yet another embodiment; and FIG. 13 lists port connections of a fiber-interconnect device that can be used in the ROADM of FIG. 1 according to yet another embodiment.

DETAILED DESCRIPTION

Some embodiments disclosed herein can advantageously be used to implement a ROADM that has one or more of the following features:

(i) a color-independent, or "colorless," capability;

(ii) a direction-independent, or "directionless," capability;

(iii) a contention-free, or "contentionless," capability; and
(iv) compatibility with a flexible ITU grid, or a "gridless" capability.

For example, the colorless capability can be used to enable the network operator to assign any carrier wavelength (color) within a predetermined spectrum (e.g., the C-band) to any add/drop port by way of software control, and without a technician on site. The directionless capability can be used to allow any carrier wavelength to be routed to any direction (degree) associated with the ROADM by software control, and without physical rewiring or re-cabling. The contentionless capability can be used to allow multiple optical signals of the same carrier wavelength to be processed by the same add/drop block without any partitioning restrictions. The gridless capability can be used to enable the ROADM to operate at any speed by setting a spacing between adjacent carrier wavelengths to any predetermined value, e.g., selected from a set of predetermined values generated using increments of 3.125 GHz, 6.5 GHz, or any other suitable incremental value.

Figure 1:
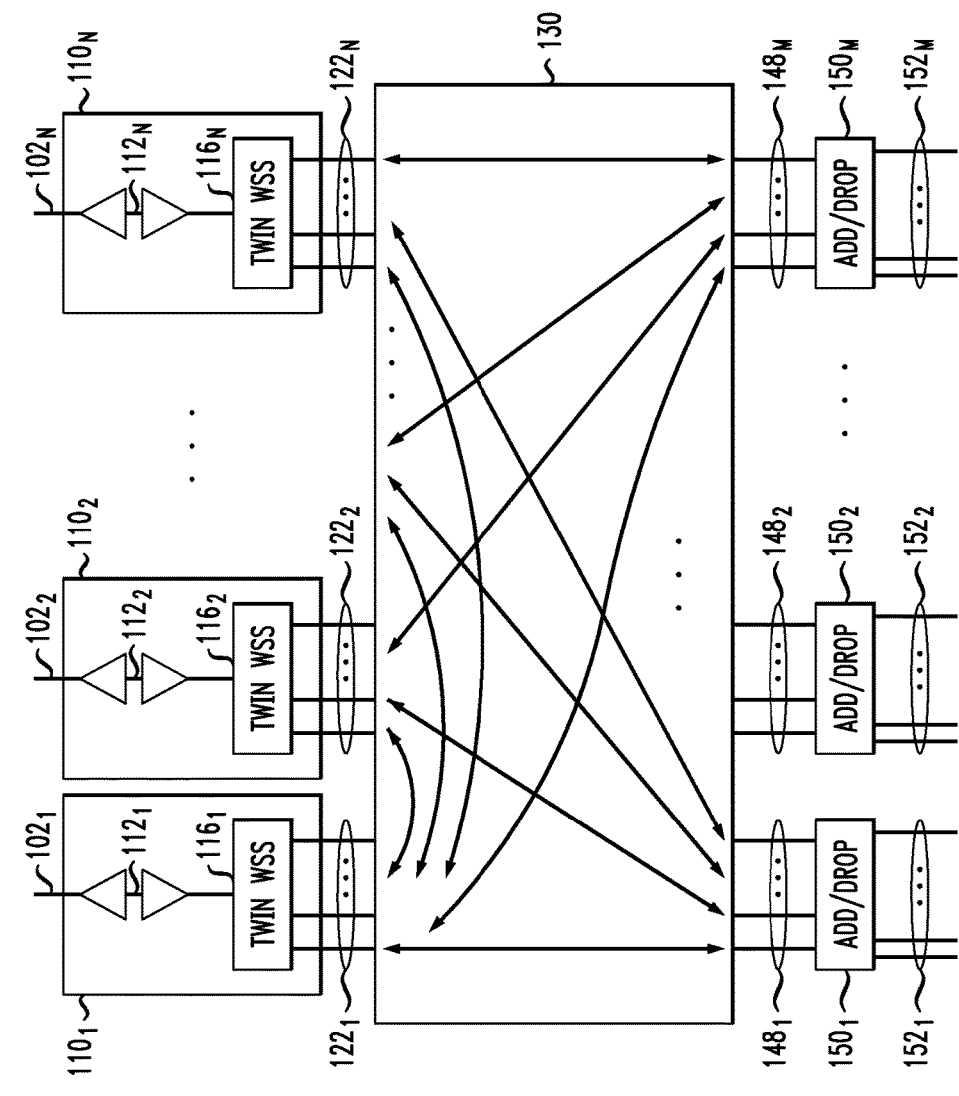
FIG. 1 shows a block diagram of a ROADM according to an embodiment.

FIG. 1 shows a block diagram of a ROADM 100 according to an embodiment. ROADM 100 is a degree-N ROADM, where N is an integer greater than one. Although FIG. 1 illustrates an embodiment of ROADM 100 corresponding to N>2, embodiments in which N=2 are also contemplated (see, e.g., FIG. 5). In some embodiments, ROADM 100 can be designed to have any subset or all of the above-listed ROADM capabilities. Various embodiments of ROADM 100 can be used, e.g., to implement various nodes of an optical network (not explicitly shown in FIG. 1).

ROADM 100 comprises optical-line modules $110_1$-$110_N$, each connected between a fiber-interconnect device 130 and a respective one of optical lines $102_1$-$102_N$. Fiber-interconnect device 130 optically interconnects optical-line modules $110_1$-$110_N$ and optical add/drop blocks $150_1$-$150_M$ as described in more detail below, where M is an integer greater than one. Each of optical lines $102_1$-$102_N$ is configured to support a duplex optical connection associated with a respective degree of ROADM 100. In an example embodiment, an optical line 102 is implemented using a duplex fiber pair. In some alternative embodiments, an optical line 102 can be implemented using a single optical fiber or a fiber-optic cable having multiple strands of fiber. In some embodiments, M≥N.

In an example embodiment, optical-line module $110_i$ (where i=1, 2, . . . , N) includes a bidirectional optical amplifier $112_i$ and a wavelength-selective switch (WSS) $116_i$. Optical amplifier $112_i$ operates to appropriately amplify (i) the optical input signals applied thereto by optical line $102_i$ and (ii) the optical output signals that are applied to optical line $102_i$ for being transported out, e.g., to a remote network node (not explicitly shown in FIG. 1). WSS $116_i$ may include two sub-switches (not explicitly shown in FIG. 1). In such embodiments, the first of the two sub-switches of WSS $116_i$ can be configured to appropriately de-multiplex an input wavelength-division-multiplexed (WDM) signal received through optical line $102_i$ and apply the resulting de-multiplexed optical signals to a corresponding subset of optical fibers $122_i$ that connect the WSS and fiber-interconnect device 130. The second of the two sub-switches of WSS $116_i$ can be configured to multiplex optical signals received through another subset of optical fibers $122_i$ from fiber-interconnect device 130 and direct the resulting output WDM signal to optical line $102_i$.

In an example embodiment, each set of optical fibers $122_i$ may include forty simplex optical fibers, e.g., twenty per propagation direction. In another example embodiment, each set of optical fibers $122_i$ may include sixty-four simplex optical fibers, e.g., thirty-two per propagation direction. In yet another example embodiment, each set of optical fibers $122_i$ may include eighty simplex optical fibers, e.g., forty per propagation direction, etc. Example embodiments of input/output (I/O) ports of WSS $116_i$ to which the set of optical fibers $122_i$ can be connected are described in more detail in reference to FIGS. 4 and 10.

In an example embodiment, add/drop block $150_j$ (where j=1, 2, . . . , M) includes an add sub-block and a drop sub-block (not explicitly shown in FIG. 1). The add sub-block of add/drop block $150_j$ operates to appropriately multiplex the optical signals received through a subset of optical fibers $152_j$ from the corresponding external optical transmitters (not explicitly shown in FIG. 1) and apply the one or more resulting WDM signals to the corresponding subset of optical fibers $148_j$ that connect add/drop block $150_j$ and fiber-interconnect device 130. The drop sub-block of add/drop block $150_j$ operates to appropriately de-multiplex the WDM signals received through another subset of optical fibers $148_j$ and direct the resulting de-multiplexed optical signals, through another subset of optical fibers $152_j$, to the corresponding external optical receivers (not explicitly shown in FIG. 1).

In an example embodiment, each of the add and drop sub-blocks of add/drop block $150_j$ can be implemented using a respective optical multicast switch. A person of ordinary skill in the art will understand that the sizes of these optical multicast switches may depend on the degree N of ROADM 100 and the numbers of external optical transmitters and receivers connected, by way of optical fibers $152_j$, to add/drop block $150_j$.

Fiber-interconnect device 130 interconnects the sets of optical fibers $122_i$ and $148_j$ in a manner that provides the following duplex connections: (i) between the optical-line modules of any pair of optical-line modules $110_i$ and (ii) between any optical-line module $110_i$ and any add/drop block $150_j$. For example, fiber-interconnect device 130 operates to connect the set of optical fibers $122_1$ to the sets of optical fibers $122_2$-$122_N$ and to the sets of optical fibers $148_j$ to provide (N+M−1) duplex connections for optical-line module $110_1$, wherein (N−1) duplex connections connect optical-line module $110_1$ to each of optical line modules $110_2$-$110_N$, and M duplex connections connect optical-line module $110_1$ to each of optical add/drop blocks $150_1$-$150_M$. Fiber-interconnect device 130 also operates to connect the set of optical fibers $122_2$ to the sets of optical fibers $122_1$, $122_3$-$122_N$ and to the sets of optical fibers $148_j$ to provide (N+M−1) duplex connections for optical-line module $110_2$, wherein (N−1) duplex connections connect optical-line module $110_2$ to each of optical line modules $110_1$, $110_3$-$110_N$, and M duplex connections connect optical-line module $110_2$ to each of optical add/drop blocks $150_1$-$150_M$, and so on.

In an example embodiment, the sets of optical fibers $122_i$ and $148_j$ are implemented using fiber-optic cables terminated by suitable multi-fiber connectors. Each of the fiber-optic cables that implements optical fibers $122_i$ has a first connector that is mated with a matching connector located on optical-line module $110_i$, and a second connector that is mated with a matching connector located on fiber-interconnect device 130. Each of the fiber-optic cables that implement optical fibers $148_j$ similarly has a first connector that is mated with a matching connector located on fiber-interconnect device 130, and a second connector that is mated with a matching connector located on add/drop block $150_j$.

Examples of the fiber-optic cables that can be used to implement the sets of optical fibers $122_i$ and $148_j$ are shown in FIGS. 2A-2C.

In some embodiments, the connectors used in the fiber-optic cables that implement the sets of optical fibers $122_i$ and $148_j$ can be selected from the assortment of multi-fiber connectors defined in the following standards: (i) IEC-61754-7, "Fibre optic interconnecting devices and passive components—Fibre optic connector interfaces—Part 7: Type MPO connector family" and (ii) TIA-604-5-D, "Fiber Optic Connector Intermateability Standard, Type MPO," both of which standards are incorporated herein by reference in their entirety. These standards refer to the multi-fiber connectors defined therein as Multi-fiber Push On (MPO) connectors. In the corresponding embodiments, optical-line modules 110, fiber-interconnect device 130, and add/drop blocks 150 have the matching MPO connectors that can be properly mated with the MPO connectors of the fiber-optic cables.

In an example embodiment, fiber-interconnect device 130 has a modular structure, several examples of which are described in more detail below in reference to FIGS. 7-9 and 11-13. The number of modules in the modular structure depends, inter alia, on the numbers N and M. For example, in some embodiments of ROADM 100 in which N=2, 3, or 4, fiber-interconnect device 130 can be implemented using a single fiber-interconnect module 300, an example of which is described in more detail below in reference to FIG. 3. In some embodiments of ROADM 100 in which N>4, fiber-interconnect device 130 can be implemented using two or more nominal copies of fiber-interconnect module 300. Example optical connections between the fiber-interconnect modules 300 of fiber-interconnect device 130 for several embodiments of ROADM 100 corresponding to different numbers N are described in more detail below in reference to FIGS. 5-9 and 11-13.

An example embodiment of fiber-interconnect device 130 may have one or more of the following technical features:
  (i) uses a single type of fiber-optic connectors, which enables the use of a corresponding single type of fiber-optic cable to implement all of the sets of optical fibers $122_i$ and $148_j$;
  (ii) uses a single type of fiber-interconnect module (e.g., 300, FIG. 3) to implement fiber-interconnect device 130 corresponding to different numbers N. For example, additional fiber-interconnect modules of the same type can simply be added and connected as the value of N increases; and
  (iii) provides efficient utilization of the available fiber strands within the deployed fiber-optic cables to reduce or minimize the number of idle or unutilized fiber strands.

Some of the possible benefits of these technical features can be as follows. Accidental use of a wrong type of fiber-optic cable can substantially be avoided, e.g., because only a single type of MPO-connector-terminated fiber-optic cable needs to be ordered and stocked up. The ability to use a single type of fiber-interconnect module in the ROADMs of different degrees N provides an easily scalable fiber-management solution, e.g., because the optical-network operator can substantially avoid having to order and/or stock up fiber-interconnect modules of several different types. The number of fiber-optic connectors on faceplates of optical-line modules 110, fiber-interconnect device 130, and add/drop blocks 150 can be reduced compared to that in a functionally comparable conventional ROADM, thereby potentially reducing the connector density on the faceplates and the associated ROADM cost.

FIGS. 2A-2C illustrate a fiber-optic cable 200 that can be used in some embodiments of ROADM 100 (FIG. 1). More specifically, FIG. 2A shows an overall view of cable 200. FIG. 2B shows a front view of a terminus 202 of a first variant of cable 200. FIG. 2C shows a front view of a terminus 202 of a second variant of cable 200. In an example embodiment of ROADM 100, a plurality of cables 200 can be used to implement the sets of optical fibers $122_i$ and $148_j$.

Cable 200 comprises MPO connectors $210_1$ and $210_2$ that terminate a cord or ribbon 220 of sheathed optical fibers at the opposite ends of the cable. Each of MPO connectors 210 comprises a substantially rectangular molded plastic ferrule 212 that encapsulates the end portions of the optical fibers. In different variants of cable 200, the optical fibers can be arranged at the terminus 202 of MPO connector 210 in one to six rows of twelve fibers each.

FIG. 2B illustrates a first possible variant of cable 200 that has twelve optical fibers 204 arranged in a single row at each of termini $202_1$ and $202_2$ as indicated in the figure. Each of termini $202_1$ and $202_2$ also has a pair of alignment pins or holes 206 that enable proper alignment of optical fibers 204 with the corresponding optical fibers of the mating MPO connector (not explicitly shown in FIG. 2B; see, e.g., FIGS. 3A, 4, and 10). A person of ordinary skill in the art will understand that, in the pair of mating MPO connectors, one connector typically has pins 206 while the other connector has holes 206 that accept those pins.

FIG. 2C illustrates a second possible variant of cable 200 that has seventy-two optical fibers 204 arranged in six rows of twelve fibers each at each of termini $202_1$ and $202_2$ as indicated in the figure. In this variant, each of termini $202_1$ and $202_2$ also has a pair of alignment pins or holes 206 that enable proper alignment of optical fibers 204 with the corresponding optical fibers of the mating connector (not explicitly shown in FIG. 2C).

In alternative embodiments of ROADM 100, other variants of cable 200 can similarly be used. Such variants may differ from one another, e.g., in the number of rows in which optical fibers 204 are arranged at the corresponding termini of the cable and/or in the number of optical fibers 204 per row.

Figure 3A:
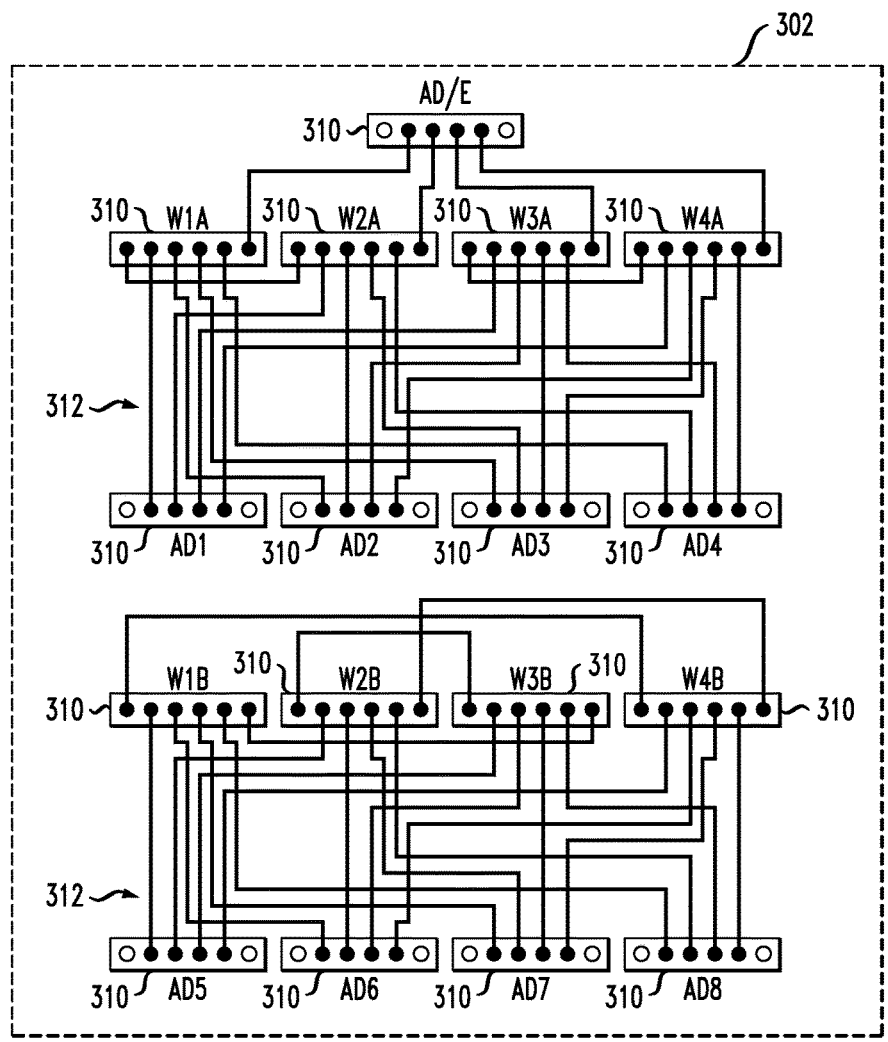
FIGS. 3A-3B illustrate a fiber-interconnect module that can be used in the ROADM of FIG. 1 according to an embodiment.
Figure 3B:
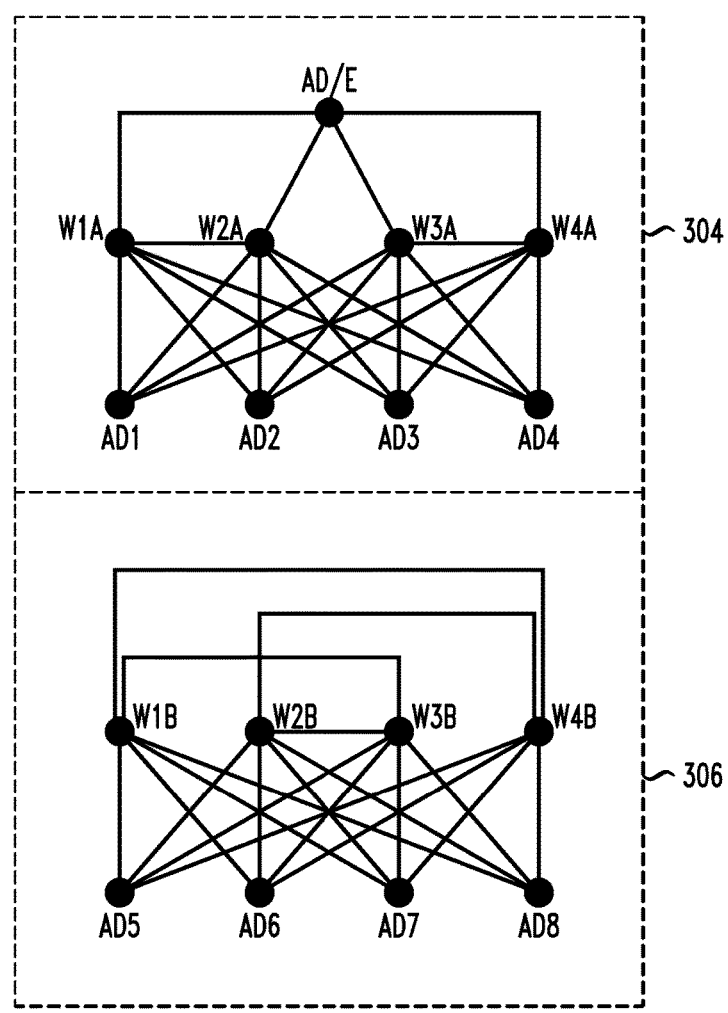

FIGS. 3A-3B illustrate a fiber-interconnect module 300 that can be used to implement fiber-interconnect device 130 according to an embodiment. More specifically, FIG. 3A shows a block diagram of fiber-interconnect module 300. FIG. 3B shows a duplex port-level connection diagram of fiber-interconnect module 300. As already indicated above, various embodiments of fiber-interconnect device 130 may include one or more instances (nominal copies) of fiber-interconnect module 300.

Referring to FIG. 3A, fiber-interconnect module 300 has seventeen input/output (I/O) optical ports that are labeled WkA, WkB, AD1-AD8, and AD/E, respectively, where k=1, 2, 3, 4. Each of these I/O ports is implemented using a multi-fiber connector 310. In an example embodiment, multi-fiber connector 310 is a 12-fiber MPO connector that can accept an MPO cable 200 having an MPO connector 210 with the fiber arrangement shown in FIG. 2B. In an example embodiment, multi-fiber connectors 310 can be mounted on a faceplate of a body 302 of fiber-interconnect module 300 in a manner that enables an MPO connector 210 to be easily mated with any of the multi-fiber connectors 310 thereon.

FIG. 3A depicts the twelve fibers of each multi-fiber connector 310 as six circles, with each circle representing a duplex fiber pair. Each filled circle represents a duplex fiber pair of multi-fiber connector 310 that is connected, using optical waveguides 312, to a duplex fiber pair of another multi-fiber connector 310. Each empty circle represents an unconnected duplex fiber pair of multi-fiber connector 310. Optical waveguides 312 are internal optical waveguides laid within and/or enclosed by body 302 of fiber-interconnect module 300. In various embodiments, optical waveguides 312 can be implemented using optical fibers, planar optical waveguide circuits, or various combinations thereof. In FIG. 3A, each of the lines that connects two corresponding filled circles of multi-fiber connectors 310 represents the corresponding duplex pair of optical waveguides 312.

Multi-fiber connectors 310 of I/O ports WkA and WkB have all of their six duplex fiber pairs connected to other I/O ports of fiber-interconnect module 300 by way of optical waveguides 312. In contrast, multi-fiber connectors 310 of I/O ports AD1-AD8 and AD/E have only four duplex fiber pairs connected to other I/O ports of fiber-interconnect module 300 by way of optical waveguides 312. In an example embodiment, the unconnected duplex fiber pairs of each those multi-fiber connectors 310 include the two outermost fibers at one end of the fiber row and the two outermost fibers at the opposite end of the fiber row (also see FIG. 2B).

Referring to FIG. 3B, the seventeen I/O ports WkA, WkB, AD1-AD8, and AD/E of fiber-interconnect module 300 are arranged in two logic groups, which are labeled 304 and 306, respectively. Group 304 includes nine I/O ports: WkA, AD1-AD4, and AD/E. Group 306 includes eight I/O ports: WkB and AD5-AD8. Fiber-interconnect module 300 does not have any internal optical connections (or optical waveguides 312 connected) between any I/O port belonging to group 304 and any I/O port belonging to group 306.

Fiber-interconnect module 300 has the following internal duplex connections between the I/O ports of group 304:
 (i) each of I/O ports WkA is connected to one other I/O port WkA;
 (ii) each of I/O ports WkA is connected to I/O port AD/E;
 (iii) each of I/O ports WkA is connected to each of I/O ports AD1-AD4;
 (iv) I/O port AD/E is connected to each of I/O ports WkA; and
 (v) each of I/O ports AD1-AD4 is connected to each of I/O ports WkA.

In some embodiments, connections (i), (ii), and (iv) within group 304 may not be present.

Fiber-interconnect module 300 further has the following internal duplex connections between the I/O ports of group 306:
 (i) each of I/O ports WkB is connected to two other I/O ports WkB;
 (ii) each of I/O ports WkB is connected to each of I/O ports AD5-AD8; and
 (iii) each of I/O ports AD5-AD8 is connected to each of I/O ports WkB.

In some embodiments, connections (i) within group 306 may not be present.

FIG. 4 shows a set $400_i$ of I/O ports P1-P4 of WSS $116_i$ (FIG. 1) according to an embodiment. Each of I/O ports P1-P4 of the set $400_i$ is implemented using a respective instance of multi-fiber connector 310 (also see FIG. 3A). The connectivity of the four multi-fiber connectors 310 of the set 400 is depicted in FIG. 4 in the same manner as in FIG. 3A, using filled and empty circles to represent connected and unconnected duplex fiber pairs, respectively.

As can be seen in FIG. 4, multi-fiber connectors 310 of I/O ports P1 and P2 have all of their six duplex fiber pairs internally connected to the physical switching device of WSS $116_i$ (not explicitly shown in FIG. 4). In contrast, multi-fiber connectors 310 of I/O ports P3 and P4 have only four duplex fiber pairs internally connected to the physical switching device of WSS $116_i$. This configuration of the optical fibers in I/O ports P1-P4 can be referred to as the (6, 6, 4, 4) configuration. I/O ports P1-P4 can be used to connect WSS $116_i$ to up to forty simplex optical fibers $122_i$ implemented using up to four cables 200, each having MPO connectors 210 with the fiber arrangement shown in FIG. 2B.

FIG. 5 shows a block diagram of an arrangement 500 that can be used to implement an embodiment of ROADM 100 corresponding to N=2 and M≤5. Arrangement 500 comprises: (i) the set $400_1$ of I/O ports P1-P4 of WSS $116_1$; (ii) the set $400_2$ of I/O ports P1-P4 of WSS $116_2$; (iii) fiber-interconnect module 300; and (iv) two multi-fiber cables 200, which are labeled $200_1$ and $200_2$, respectively. Cable $200_1$ connects I/O port P1 of WSS $116_1$ and I/O port W1A of fiber-interconnect module 300. Cable $200_2$ similarly connects I/O port P1 of WSS $116_2$ and I/O port W2A of fiber-interconnect module 300.

Inspection of FIGS. 3 and 4 reveals that arrangement 500 provides the following duplex optical connections:
 (i) WSS $116_1$ and WSS $116_2$ are connected to one another by way of cable $200_1$, the internal connection between I/O ports W1A and W2A within fiber-interconnect module 300 (not explicitly shown in FIG. 5; see group 304, FIG. 3B), and cable $200_2$;
 (ii) WSS $116_1$ is further connected to each of I/O ports AD1-AD4 and AD/E by way of cable $200_1$ and the internal connections between I/O port W1A and each of I/O ports AD1-AD4 and AD/E within fiber-interconnect module 300 (not explicitly shown in FIG. 5; see group 304, FIG. 3B); and
 (iii) WSS $116_2$ is further connected to each of I/O ports AD1-AD4 and AD/E by way of cable $200_2$ and the internal connections between I/O port W2A and each of I/O ports AD1-AD4 and AD/E within fiber-interconnect module 300 (not explicitly shown in FIG. 5; see group 304, FIG. 3B).

A person of ordinary skill in the art will understand that these duplex connections are sufficient for an implementation of a degree-2 ROADM 100 having up to five optical add/drop blocks 150. For example, in an embodiment of ROADM 100 corresponding to M=5, optical add/drop blocks $150_1$-$150_5$ can be connected to I/O ports AD1-AD4 and AD/E, respectively, of fiber-interconnect module 300 using five additional cables 200 (not explicitly shown in FIG. 5).

Further inspection of FIGS. 3 and 4 also reveals that I/O ports W3A, W4A, WkB, and AD5-AD8 of fiber-interconnect module 300 in arrangement 500 are not connected to WSS's $116_1$ and $116_2$.

Figure 6:
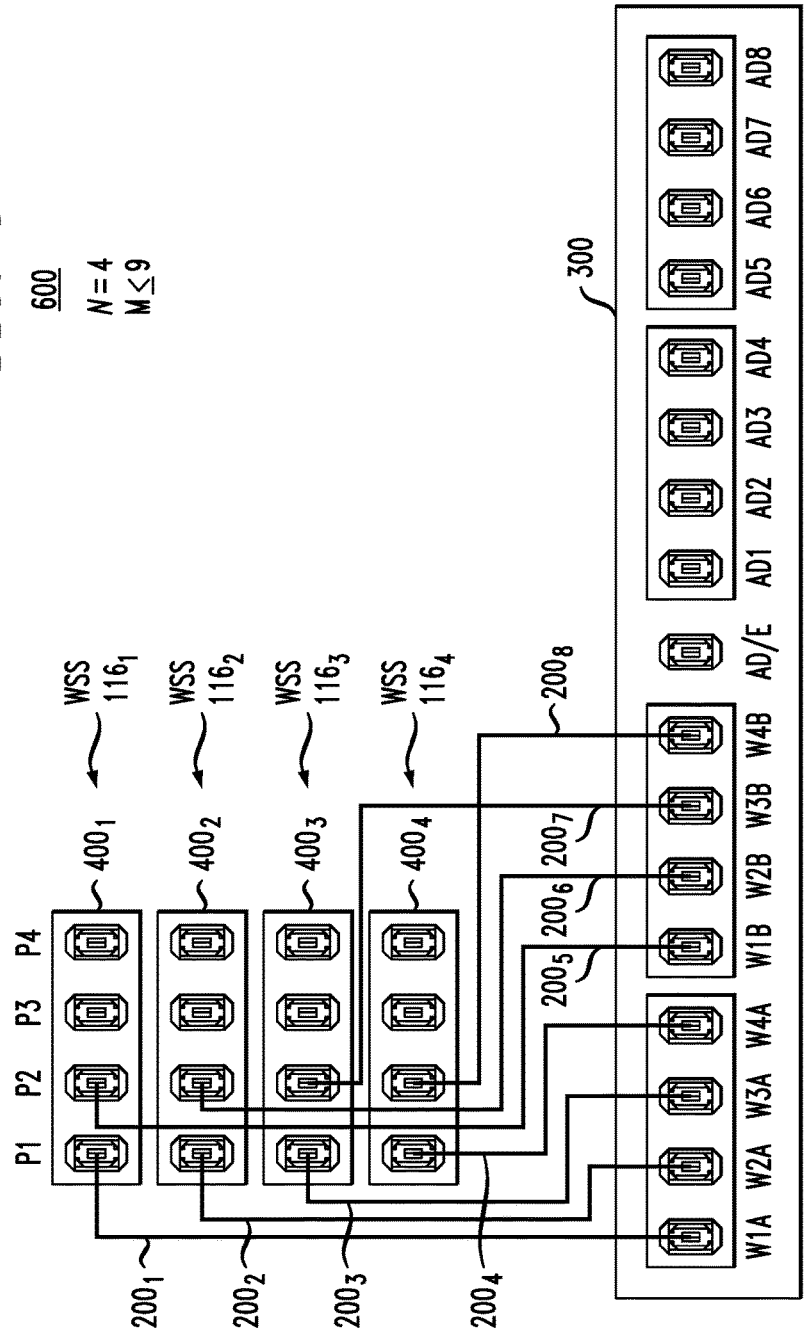
FIG. 6 illustrates an arrangement of parts that can be used to implement a degree-4 ROADM according to an embodiment.

FIG. 6 shows a block diagram of an arrangement 600 that can be used to implement an embodiment of ROADM 100 corresponding to N=4 and M≤9. Arrangement 600 comprises: (i) the set $400_1$ of I/O ports P1-P4 of WSS $116_1$; (ii) the set $400_2$ of I/O ports P1-P4 of WSS $116_2$; (iii) the set $400_3$ of I/O ports P1-P4 of WSS $116_3$; (iv) the set $400_4$ of I/O ports P1-P4 of WSS $116_4$; (v) fiber-interconnect module 300; and (iv) eight cables 200, which are labeled $200_1$-$200_8$, respectively. Cable $200_1$ connects I/O port P1 of WSS $116_1$ and I/O port W1A of fiber-interconnect module 300. Cable $200_2$ connects I/O port P1 of WSS $116_2$ and I/O port W2A of fiber-interconnect module 300. Cable $200_3$ connects I/O port P1 of WSS $116_3$ and I/O port W3A of fiber-interconnect module 300. Cable $200_4$ connects I/O port P1 of WSS $116_4$ and I/O port W4A of fiber-interconnect module 300. Cable $200_5$ connects I/O port P2 of WSS $116_1$ and I/O port W1B of fiber-interconnect module 300. Cable $200_6$ connects I/O port P2 of WSS $116_2$ and I/O port W2B of fiber-interconnect module 300. Cable $200_7$ connects I/O port P2 of WSS $116_3$ and I/O port W3B of fiber-interconnect module 300. Cable $200_8$ connects I/O port P2 of WSS $116_4$ and I/O port W4B of fiber-interconnect module 300.

Inspection of FIGS. 3 and 4 reveals that arrangement 600 provides the following duplex optical connections:
(i) each of WSS's $116_1$-$116_4$ is connected to each of the other three WSS's of this WSS set; and
(ii) each of WSS's $116_1$-$116_4$ is further connected to each of I/O ports AD1-AD8 and AD/E.

A person of ordinary skill in the art will understand that these duplex connections are sufficient for an implementation of a degree-4 ROADM 100 having up to nine optical add/drop blocks 150. For example, in an embodiment of ROADM 100 corresponding to M=9, optical add/drop blocks $150_1$-$150_9$ can be connected to I/O ports AD1-AD8 and AD/E, respectively, of fiber-interconnect module 300 using nine additional cables 200 (not explicitly shown in FIG. 6).

Figure 7:
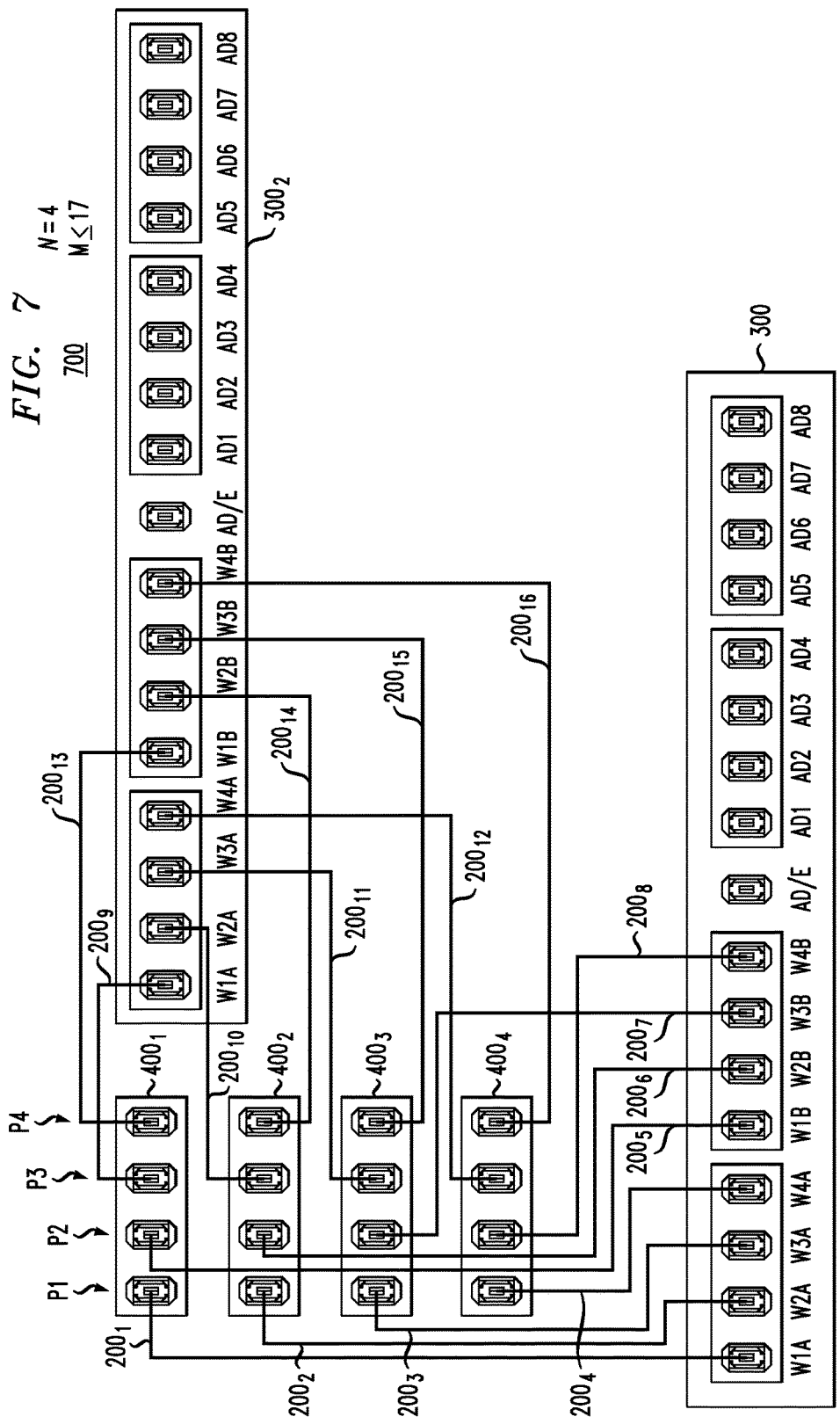
FIG. 7 illustrates an arrangement of parts that can be used to implement a degree-4 ROADM according to an alternative embodiment.

FIG. 7 shows a block diagram of an arrangement 700 that can be used to implement an embodiment of ROADM 100 corresponding to N=4 and M≤17. Arrangement 700 represents a modification of arrangement 600 (FIG. 6) that further includes (i) an additional instance of fiber-interconnect module 300, which is labeled $300_2$, and (ii) eight additional cables 200, which are labeled $200_9$-$200_{16}$. Cable $200_9$ connects I/O port P3 of WSS $116_1$ and I/O port W1A of fiber-interconnect module $300_2$. Cable $200_{10}$ connects I/O port P3 of WSS $116_2$ and I/O port W2A of fiber-interconnect module $300_2$. Cable $200_{11}$ connects I/O port P3 of WSS $116_3$ and I/O port W3A of fiber-interconnect module $300_2$. Cable $200_{12}$ connects I/O port P3 of WSS $116_4$ and I/O port W4A of fiber-interconnect module $300_2$. Cable $200_{13}$ connects I/O port P4 of WSS $116_1$ and I/O port W1B of fiber-interconnect module $300_2$. Cable $200_{14}$ connects I/O port P4 of WSS $116_2$ and I/O port W2B of fiber-interconnect module $300_2$. Cable $200_{15}$ connects I/O port P4 of WSS $116_3$ and I/O port W3B of fiber-interconnect module $300_2$. Cable $200_{16}$ connects I/O port P4 of WSS $116_4$ and I/O port W4B of fiber-interconnect module $300_2$.

In addition to the duplex optical connections listed above for arrangement 600 (FIG. 6), arrangement 700 provides duplex optical connections between each of WSS's $116_1$-$116_4$ and each of I/O ports AD1-AD8 of fiber-interconnect module $300_2$. As a result, up to eight additional optical add/drop blocks 150 can be connected to I/O ports AD1-AD8 of fiber-interconnect module $300_2$, for a total of up to seventeen optical add/drop blocks 150 being connectable to arrangement 700.

FIG. 8 shows a table that lists port connections of fiber-interconnect device 130 that can be used to implement an embodiment of ROADM 100 corresponding to N=8 and M=13. In this particular embodiment, ROADM 100 includes WSS's $116_1$-$116_8$, each having a respective set $400_i$ of I/O ports P1-P4, where i=1, 2, . . . , 8 (also see FIG. 4). ROADM 100 further includes thirteen optical add/drop blocks 150, which are labeled $150_1$-$150_{13}$, respectively. Fiber-interconnect device 130 includes four instances (nominal copies) of fiber-interconnect module 300 (FIG. 3), which are labeled $300_1$-$300_4$, respectively. Each of the listed port connections is implemented using a respective instance of cable 200 (also see FIGS. 2A, 2B). Note that, in this embodiment, each of add/drop blocks $150_1$-$150_{13}$ is connected to fiber-interconnect device 130 using a respective pair of cables 200.

Using FIGS. 3-4, it can be verified in a relatively straightforward manner that fiber-interconnect modules $300_1$-$300_4$ connected as indicated in FIG. 8 provide mesh connections between WSS's $116_1$-$116_8$. The indicated number M=13 represents a non-limiting example. In an alternative embodiment, the number M of optical add/drop blocks 150 can be changed, e.g., by disconnecting some of the optical add/drop blocks $150_1$-$150_{13}$. Fiber-interconnect device 130 of FIG. 8 advantageously lends itself to a relatively straightforward modification if the degree N of ROADM 100 needs to be increased, e.g., to N=12. An example of such a modification can be obtained, e.g., by looking at the differences between FIGS. 8 and 9.

FIG. 9 shows a table that lists port connections of fiber-interconnect device 130 that can be used to implement an embodiment of ROADM 100 corresponding to N=12 and M=9. In this particular embodiment, ROADM 100 includes WSS's $116_1$-$116_{12}$, each having a respective set $400_i$ of I/O ports P1-P4, where i=1, 2, . . . , 12 (also see FIG. 4). ROADM 100 further includes nine optical add/drop blocks 150, which are labeled $150_1$-$150_9$, respectively. Fiber-interconnect device 130 includes five instances (nominal copies) of fiber-interconnect module 300 (FIG. 3), which are labeled $300_1$-$300_5$, respectively. Each port connection is implemented using a respective instance of cable 200 (see FIGS. 2A, 2B). Note that, in this embodiment, each of add/drop blocks $150_1$-$150_9$ is connected to fiber-interconnect device 130 using a respective set of three cables 200.

The fiber-interconnect device 130 of FIG. 9 can be obtained, e.g., from the fiber-interconnect device 130 of FIG. 8 by (i) adding fiber-interconnect module $300_5$ connected as indicated in the corresponding column of Table 2 (FIG. 9) and (ii) if applicable, changing some of the port connections of fiber-interconnect modules $300_2$ and $300_4$. The new and changed port connections are indicated in FIG. 9 in Bold/Italic. The new port connections correspond to fiber-interconnect module $300_5$. The changed port connections may include the I/O ports AD1-AD4 of fiber-interconnect module $300_2$ and the I/O ports AD1-AD4 of fiber-interconnect module $300_4$. If the latter eight I/O ports were not previously connected (e.g., in case the previous configuration was used to connect only nine add/drop blocks 150 in the corresponding embodiment of ROADM 100 characterized by N=8 and M=9), then the port connections indicated in FIG. 9 in Bold/Italic are all new connections that embody a possible non-disruptive, in-service expansion of the ROADM from degree 8 to degree 12.

Fiber-interconnect modules $300_1$-$300_5$ connected as indicated in FIG. 9 provide mesh connections between WSS's $116_1$-$116_{12}$. The indicated number M=9 represents a non-limiting example and can be changed. Using the example modification(s) illustrated by the differences between FIGS. 8 and 9, a person of ordinary skill in the art will understand how to make further modifications to fiber-interconnect device 130 by adding more fiber-interconnect modules 300 to further increase the number N, e.g., to N=16, 20, 24, and so on, in increments of four.

FIG. 10 shows a set $1000_i$ of I/O ports P1-P7 of WSS $116_i$ (FIG. 1) according to an alternative embodiment. Each of I/O ports P1-P7 of the set $1000_i$ is implemented using a respective instance of multi-fiber connector 310 (also see FIGS. 3A and 4). The connectivity of the seven multi-fiber connectors 310 of the set 1000 are depicted in FIG. 10 in the same manner as in FIGS. 3A and 4, using filled and empty circles to represent the internally connected and unconnected duplex fiber pairs, respectively.

As can be seen in FIG. 10, multi-fiber connectors 310 of I/O ports P1 and P2 have all of their six duplex fiber pairs internally connected to the physical switching device of WSS $116_i$ (not explicitly shown in FIG. 10). In contrast, multi-fiber connectors 310 of I/O ports P3-P7 have only four duplex fiber pairs internally connected to the physical switching device of WSS $116_i$. This configuration of the optical fibers in I/O ports P1-P7 can be referred to as the (6, 6, 4, 4, 4, 4, 4) configuration. I/O ports P1-P7 can be used to connect WSS $116_i$ to up to sixty-four simplex optical fibers $122_i$ implemented using up to seven cables 200, each having MPO connectors 210 with the fiber arrangement shown in FIG. 2B.

FIG. 11 shows a table that lists port connections of fiber-interconnect device 130 that can be used to implement an embodiment of ROADM 100 corresponding to N=12 and M=17. In this particular embodiment, ROADM 100 includes WSS's $116_1$-$116_{12}$, each having a respective set $1000_i$ of I/O ports P1-P7, where i=1, 2, ..., 12 (also see FIG. 10). ROADM 100 further includes seventeen optical add/drop blocks 150, which are labeled $150_1$-$150_{17}$, respectively. Fiber-interconnect device 130 includes eight instances (nominal copies) of fiber-interconnect module 300 (FIG. 3), which are labeled $300_1$-$300_8$, respectively. Each port connection is implemented using a respective instance of cable 200 (see FIGS. 2A, 2B). Note that, in this embodiment, each of add/drop blocks $150_1$-$150_{17}$ is connected to fiber-interconnect device 130 using a respective set of three cables 200. The I/O ports P7 of the sets $1000_i$ are not connected to fiber-interconnect device 130.

Fiber-interconnect modules $300_1$-$300_8$ connected as indicated in FIG. 11 provide mesh connections between WSS's $116_1$-$116_{12}$. The indicated number M=17 represents a non-limiting example and can be changed, e.g., by disconnecting some of the optical add/drop blocks $150_1$-$150_{17}$. Fiber-interconnect device 130 of FIG. 11 advantageously lends itself to a relatively straightforward modification if the degree N of ROADM 100 needs to be increased, e.g., as further illustrated by FIGS. 12-13.

FIG. 12 shows a table that lists port connections of fiber-interconnect device 130 that can be used to implement an embodiment of ROADM 100 corresponding to N=16 and M=17. In this particular embodiment, ROADM 100 includes WSS's $116_1$-$116_{16}$, each having a respective set $1000_i$ of I/O ports P1-P7, where i=1, 2, ..., 16 (also see FIG. 10). ROADM 100 further includes seventeen optical add/drop blocks 150, which are labeled $150_1$-$150_{17}$, respectively. Fiber-interconnect device 130 includes twelve instances (nominal copies) of fiber-interconnect module 300 (FIG. 3), which are labeled $300_1$-$300_{12}$, respectively. Each port connection is implemented using a respective instance of cable 200 (see FIGS. 2A, 2B). Note that, in this embodiment, each of add/drop blocks $150_1$-$150_{17}$ is connected to fiber-interconnect device 130 using a respective set of four cables 200.

The fiber-interconnect device 130 of FIG. 12 can be obtained, e.g., from the fiber-interconnect device 130 of FIG. 11 by (i) adding fiber-interconnect modules $300_9$-$300_{12}$ connected as indicated in the corresponding columns of Table 4 (FIG. 12) and (ii) connecting some of the unconnected I/O ports of fiber-interconnect module $300_6$ as further indicated in the corresponding column of Table 4. The new port connections are indicated in FIG. 12 in Bold/Italic.

Fiber-interconnect modules $300_1$-$300_{12}$ connected as indicated in FIG. 12 provide mesh connections between WSS's $116_1$-$116_{16}$. The indicated number M=17 represents a non-limiting example and can be changed, e.g., by disconnecting some of the optical add/drop blocks $150_1$-$150_{17}$. The following I/O ports of fiber-interconnect device 130 are not connected: (i) I/O ports AD/E of fiber-interconnect modules $300_2$, $300_3$, $300_5$, $300_6$, $300_8$-$300_{10}$, and $300_{12}$; (ii) I/O ports WkB of fiber-interconnect modules $300_9$ and $300_{10}$; and (iii) I/O ports AD5-AD8 of fiber-interconnect modules $300_9$ and $300_{10}$. In some embodiments, fiber-interconnect module $300_{12}$ can be removed by connecting the corresponding cables 200 to appropriate unconnected I/O ports of other fiber interconnect modules 300.

FIG. 13 shows a table that lists port connections of fiber-interconnect device 130 that can be used to implement an embodiment of ROADM 100 corresponding to N=20 and M=13. In this particular embodiment, ROADM 100 includes WSS's $116_1$-$116_{20}$, each having a respective set $1000_i$ of I/O ports P1-P7, where i=1, 2, ..., 20 (also see FIG. 10). ROADM 100 further includes thirteen optical add/drop blocks 150, which are labeled $150_1$-$150_{13}$, respectively. Fiber-interconnect device 130 includes fourteen instances (nominal copies) of fiber-interconnect module 300 (FIG. 3), which are labeled $300_1$-$300_{14}$, respectively. Each port connection is implemented using a respective instance of cable 200 (see FIGS. 2A, 2B). Note that, in this embodiment, each of add/drop blocks $150_1$-$150_{13}$ is connected to fiber-interconnect device 130 using a respective set of five cables 200.

The fiber-interconnect device 130 of FIG. 13 can be obtained, e.g., from the fiber-interconnect device 130 of FIG. 12 by (i) adding fiber-interconnect modules $300_{13}$-$300_{14}$ connected as indicated in the corresponding columns of Table 5 (FIG. 13) and (ii) if applicable, changing some of the port connections of fiber-interconnect modules $300_2$, $300_5$, $300_8$, and $300_{12}$ as further indicated in the corresponding columns of Table 5. The new and changed port connections are indicated in FIG. 13 in Bold/Italic.

Fiber-interconnect modules $300_1$-$300_{14}$ connected as indicated in FIG. 12 provide mesh connections between WSS's $116_1$-$116_{20}$. The indicated number M=13 represents a non-limiting example and can be changed if appropriate or necessary. The following I/O ports of fiber-interconnect device 130 are not connected: (i) I/O ports AD/E of fiber-interconnect modules $300_2$, $300_3$, $300_5$, $300_6$, $300_8$-$300_{10}$, $300_{12}$ and $300_{14}$; (ii) I/O ports WkB of fiber-interconnect modules $300_9$, $300_{10}$, and $300_{14}$; and (iii) I/O ports AD5-AD8 of fiber-interconnect modules $300_9$, $300_{10}$, and $300_{14}$. In some embodiments, one of the shown fourteen fiber-interconnect modules 300 can be removed by connecting the corresponding cables 200 to appropriate unconnected I/O ports of other fiber interconnect modules 300.

Based on the above-described examples, a person of ordinary skill in the art will understand how to make and use additional embodiments of fiber-interconnect device 130 suitable for a degree-N ROADM, where N=24, 28, 32, and so on. For example, to assemble an embodiment of fiber-interconnect device 130 for a higher-degree ROADM, more than fourteen fiber-interconnect modules 300 can be connected to WSS's 116 and add/drop blocks 150 using the patterns of connections similar to those illustrated by FIGS. 8, 9, and 11-13.

According to an example embodiment disclosed above in reference to FIGS. 1-13, provided is an apparatus (e.g., 100, FIG. 1) comprising: a first set of optical ports (e.g., WkA, FIGS. 3A-3B); a second set of optical ports (e.g., AD/E, AD1-AD4, FIGS. 3A-3B); a third set of optical ports (e.g., WkB, FIGS. 3A-3B); a fourth set of optical ports (e.g., AD5-AD7, FIGS. 3A-3B); and a plurality of optical waveguides (e.g., 312, FIG. 3A), each disposed to optically connect a respective pair of the optical ports, the plurality of optical waveguides disposed to optically connect: each optical port of the first set to each optical port of the second set; each optical port of the first set to another optical port of the first set; each optical port of the third set to each optical port of the fourth set; and each optical port of the third set to two other optical ports of the third set.

In some embodiments of the above apparatus, at least some of the optical waveguides comprise optical fibers.

In some embodiments of any of the above apparatus, the plurality of optical waveguides is disposed to optically connect: each optical port of the first set to exactly one other optical port of the first set; and each optical port of the third set to exactly two other optical ports of the third set.

In some embodiments of any of the above apparatus, each of the optical ports of the first, second, third, and fourth sets comprises a respective multi-fiber connector (e.g., 310, FIG. 3A), said multi-fiber connectors being nominally identical to one another.

In some embodiments of any of the above apparatus, each of the multi-fiber connectors is an MPO connector.

In some embodiments of any of the above apparatus, the MPO connector has a single row of optical fibers (e.g., to mate with 204, FIG. 2B).

In some embodiments of any of the above apparatus, each of the first, second, third, and fourth sets of optical ports comprises four optical ports (e.g., WkA, AD1-AD4, WkB, and AD5-AD8, respectively; FIG. 3). In some embodiments of any of the above apparatus, the second set of optical ports comprises five optical ports (e.g., AD/E, AD1-AD4, FIG. 3).

In some embodiments of any of the above apparatus, any of the first, second, third, and fourth sets has no optical ports in common with any other of the first, second, third, and fourth sets.

In some embodiments of any of the above apparatus, the plurality of optical waveguides is configured to support duplex optical connections between connected optical ports.

In some embodiments of any of the above apparatus, the plurality of optical waveguides does not have an optical waveguide that optically connects an optical port of the first or second set to an optical port of the third or fourth set (e.g., 312 do not connect 304 and 306; FIG. 3).

In some embodiments of any of the above apparatus, the apparatus further comprises: a fiber-interconnect device (e.g., 130, FIG. 1) having a plurality of optical ports that include the first, second, third, and fourth sets of optical ports; a plurality of wavelength-selective switches (e.g., $116_1$-$116_N$, FIG. 1) optically connected to some of the plurality of optical ports; and a plurality of optical add/drop blocks (e.g., $150_1$-$150_M$, FIG. 1) optically connected to some of the plurality of optical ports.

In some embodiments of any of the above apparatus, the fiber-interconnect device, the plurality of wavelength-selective switches, and the plurality of optical add/drop blocks are parts of a degree-N ROADM (e.g., 100, FIG. 1).

In some embodiments of any of the above apparatus, each wavelength-selective switch of the plurality of wavelength-selective switches is optically connected, by way of the fiber-interconnect device, to each other wavelength-selective switch of the plurality of wavelength-selective switches.

In some embodiments of any of the above apparatus, each wavelength-selective switch of the plurality of wavelength-selective switches is further optically connected, by way of the fiber-interconnect device, to each optical add/drop block of the plurality of optical add/drop blocks.

In some embodiments of any of the above apparatus, the fiber-interconnect device comprises: a first fiber-interconnect module (e.g., 300, FIG. 3) that includes the first, second, third, and fourth sets of optical ports and the plurality of optical waveguides; and a set of one or more additional fiber-interconnect modules (e.g., $300_n$, n≠1; FIGS. 7-9, 11-13), each being a nominal copy of the first fiber-interconnect module; and wherein the plurality of optical ports include the optical ports of the one or more additional fiber-interconnect modules.

In some embodiments of any of the above apparatus, N=4; and wherein the set of one or more additional fiber-interconnect modules has a single additional fiber-interconnect module (e.g., $300_2$, FIG. 7).

In some embodiments of any of the above apparatus, N=8; and wherein the set of one or more additional fiber-interconnect modules has three additional fiber-interconnect modules (e.g., $300_2$-$300_4$, FIG. 8).

In some embodiments of any of the above apparatus, N=12; and wherein the set of one or more additional fiber-interconnect modules has four additional fiber-interconnect modules (e.g., $300_2$-$300_5$, FIG. 9).

In some embodiments of any of the above apparatus, N=12; and wherein the set of one or more additional fiber-interconnect modules has seven additional fiber-interconnect modules (e.g., $300_2$-$300_8$, FIG. 11).

In some embodiments of any of the above apparatus, N=16; and wherein the set of one or more additional fiber-interconnect modules has eleven (e.g., $300_2$-$300_{12}$, FIG. 12) or ten additional fiber-interconnect modules.

In some embodiments of any of the above apparatus, N=20; and wherein the set of one or more additional fiber-interconnect modules has thirteen (e.g., $300_2$-$300_{14}$, FIG. 13) or twelve additional fiber-interconnect modules.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels (if any) in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An apparatus comprising:
   a first set of optical ports having an even number of optical ports;
   a second set of optical ports;
   a third set of optical ports;
   a fourth set of optical ports; and
   a plurality of optical waveguides, each disposed to optically connect a respective pair of the optical ports, the plurality of optical waveguides disposed to optically connect:
   each optical port of the first set to each optical port of the second set;
   each optical port of the first set to another optical port of the first set;
   each optical port of the third set to each optical port of the fourth set; and
   each optical port of the third set to two other optical ports of the third set.

2. The apparatus of claim 1, wherein at least some of the optical waveguides comprise optical fibers.

3. The apparatus of claim 1, wherein each of the optical ports of the first, second, third, and fourth sets comprises a respective multi-fiber connector, said multi-fiber connectors being nominally identical to one another.

4. The apparatus of claim 3, wherein each of the multi-fiber connectors is an MPO connector.

5. The apparatus of claim 4, wherein the MPO connector has a single row of optical fibers.

6. The apparatus of claim 1, wherein each of the first, second, third, and fourth sets of optical ports comprises four optical ports.

7. The apparatus of claim 6, wherein the second set of optical ports comprises five optical ports.

8. The apparatus of claim 1, wherein any of the first, second, third, and fourth sets has no optical ports in common with any other of the first, second, third, and fourth sets.

9. The apparatus of claim 1, wherein the plurality of optical waveguides is configured to support duplex optical connections between connected optical ports.

10. The apparatus of claim 1, wherein the plurality of optical waveguides does not have an optical waveguide that optically connects an optical port of the first or second set to an optical port of the third or fourth set.

11. The apparatus of claim 1, further comprising:
    a fiber-interconnect device having a plurality of optical ports that include the first, second, third, and fourth sets of optical ports;
    a plurality of wavelength-selective switches, each of said wavelength-selective switches being directly optically connected to a respective optical port of the first or third set of optical ports; and
    a plurality of optical add/drop blocks, each of said optical add/drop blocks being directly optically connected to a respective optical port of the second or fourth set of optical ports.

12. The apparatus of claim 11,
    wherein each wavelength-selective switch of the plurality of wavelength-selective switches is optically connected, by way of the fiber-interconnect device, to each other wavelength-selective switch of the plurality of wavelength-selective switches; and
    wherein each wavelength-selective switch of the plurality of wavelength-selective switches is further optically connected, by way of the fiber-interconnect device, to each optical add/drop block of the plurality of optical add/drop blocks.

13. The apparatus of claim 12, wherein the fiber-interconnect device comprises:
    a first fiber-interconnect module that includes the first, second, third, and fourth sets of optical ports and the plurality of optical waveguides; and
    a set of one or more additional fiber-interconnect modules, each being a nominal copy of the first fiber-interconnect module; and
    wherein the plurality of optical ports include the optical ports of the one or more additional fiber-interconnect modules.

14. The apparatus of claim 13,
    wherein the fiber-interconnect device, the plurality of wavelength-selective switches, and the plurality of optical add/drop blocks are parts of a degree-N ROADM, where N=4; and wherein the set of one or more additional fiber-interconnect modules has a single additional fiber-interconnect module.

15. The apparatus of claim 13,
wherein the fiber-interconnect device, the plurality of wavelength-selective switches, and the plurality of optical add/drop blocks are parts of a degree-N ROADM, where N=8; and
wherein the set of one or more additional fiber-interconnect modules has three additional fiber-interconnect modules.

16. The apparatus of claim 13,
wherein the fiber-interconnect device, the plurality of wavelength-selective switches, and the plurality of optical add/drop blocks are parts of a degree-N ROADM, where N=12; and
wherein the set of one or more additional fiber-interconnect modules has four additional fiber-interconnect modules.

17. The apparatus of claim 13,
wherein the fiber-interconnect device, the plurality of wavelength-selective switches, and the plurality of optical add/drop blocks are parts of a degree-N ROADM, where N=12; and
wherein the set of one or more additional fiber-interconnect modules has seven additional fiber-interconnect modules.

18. The apparatus of claim 13,
wherein the fiber-interconnect device, the plurality of wavelength-selective switches, and the plurality of optical add/drop blocks are parts of a degree-N ROADM, where N=16; and
wherein the set of one or more additional fiber-interconnect modules has eleven or ten additional fiber-interconnect modules.

19. The apparatus of claim 13,
wherein the fiber-interconnect device, the plurality of wavelength-selective switches, and the plurality of optical add/drop blocks are parts of a degree-N ROADM, where N=20; and
wherein the set of one or more additional fiber-interconnect modules has thirteen or twelve additional fiber-interconnect modules.

\* \* \* \* \*